United States Patent
Smith

[15] 3,664,028
[45] May 23, 1972

[54] DRAWING DEVICE OR APPARATUS
[72] Inventor: Donald C. Smith, 132 Bartley Ave., Mansfield, Ohio 44903
[22] Filed: May 4, 1970
[21] Appl. No.: 34,364

[52] U.S. Cl. ............................................. 33/174 B, 33/93
[51] Int. Cl. ............................................. B43l 13/20
[58] Field of Search ............. 33/26, 76 R, 76 VA, 80, 174 B, 33/174 G, 79 R

[56] References Cited

UNITED STATES PATENTS

| | | | |
|---|---|---|---|
| 1,821,369 | 9/1931 | Wetterstrand | 33/174 B |
| 2,530,437 | 11/1950 | Marks | 33/76 X |
| 2,633,644 | 4/1953 | May | 33/80 X |

FOREIGN PATENTS OR APPLICATIONS

| | | | |
|---|---|---|---|
| 277,348 | 1951 | Switzerland | 33/76 |

Primary Examiner—Leonard Forman
Assistant Examiner—Dennis A. Dearing

[57] ABSTRACT

A device or apparatus which is utilized for drawing pictures or other designs on paper or other material by using a formula, and which includes a drawing board and flat rectangular and spiral shaped members which are mounted thereto in various positions, segments of the periphery of said members providing a guide for drawing lines which produce the picture or design predetermined by the formula.

2 Claims, 6 Drawing Figures

Donald C. Smith
INVENTOR.

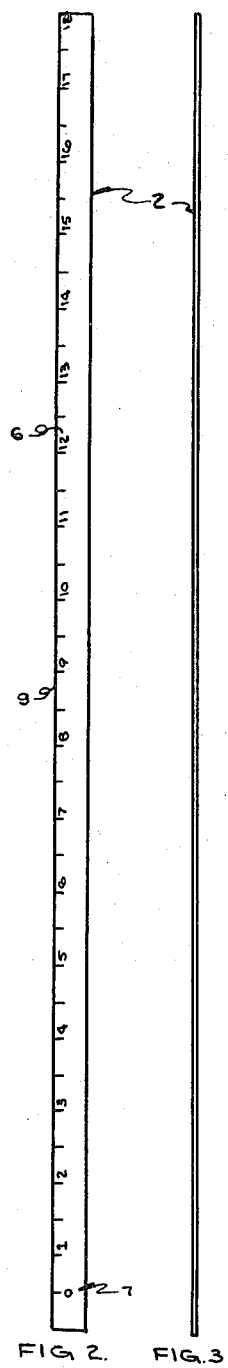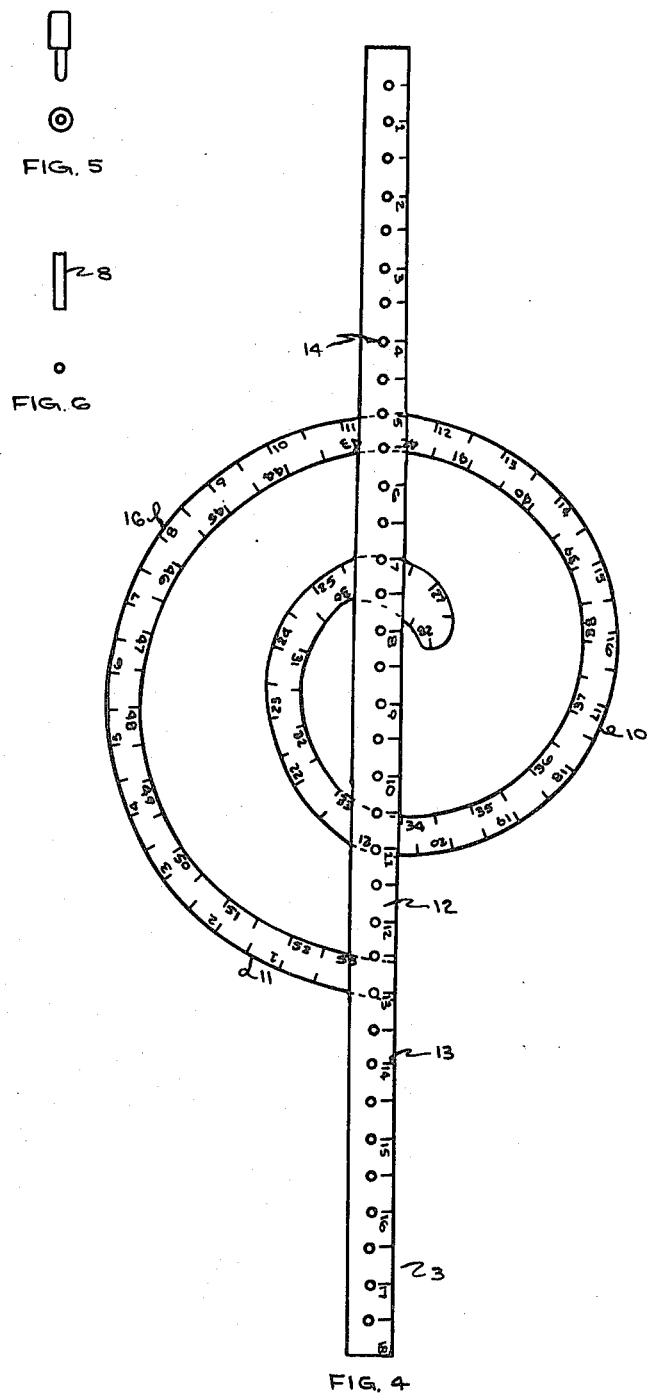

DRAWING DEVICE OR APPARATUS

This invention has as its object to provide a new or improved device or apparatus for the purpose of drawing a multiplicity of straight lines of various and predetermined lengths, and arcs or curves of various and predetermined radii and lengths at multiple and subsequent predetermined locations on the surface of paper or other suitable material by employing a pen, pencil, or like device, following a predetermined formula, the composite of said lines, arcs, and curves forming a picture, drawing, design, or alphabetic letter. The device may be used for engineering purposes, but was conceived primarily for educational and amusement purposes.

DESCRIPTION OF THE DRAWINGS

FIG. 2 is a plan view of a secondary member of rectangular shape;

FIG. 3 is a side elevation of FIG. 2.

FIG. 4 is a plan view of a spiral shaped secondary member;

FIG. 5 and FIG. 6 are perspective views of the pegs used in mounting and positioning the secondary members to the primary member.

DESCRIPTION OF THE EMBODIMENT

Figure 1:
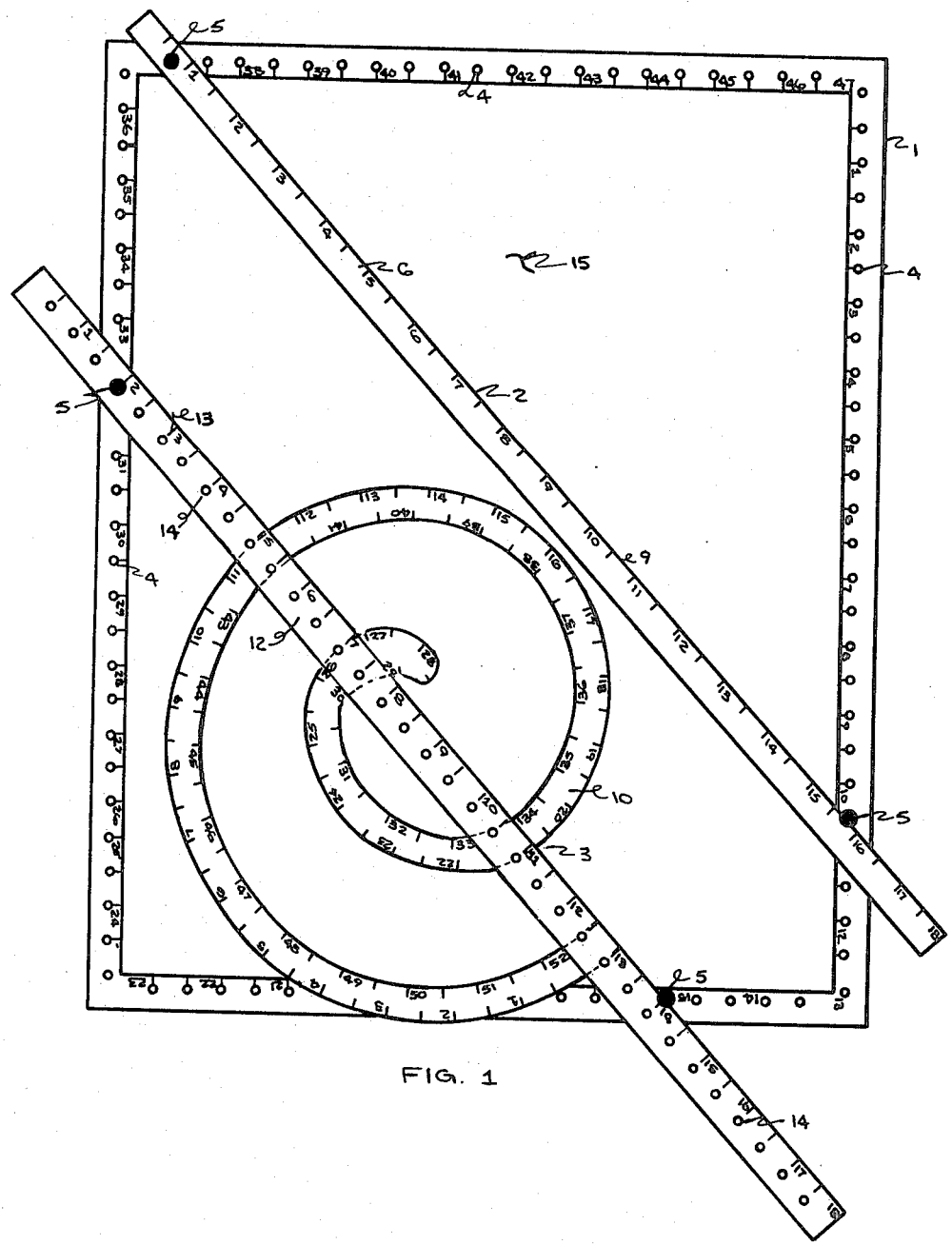
FIG. 1 is a top plan view of the primary member and two secondary members, one of rectangular shape and one incorporating a spiral design, showing possible manners of locating the secondary members to the primary member.

Referring now specifically to the drawings, basically the drawing device or apparatus consists of one primary member 1 and two secondary member 2 and 3. The primary member 1 consists of a flat drawing board which may be made of cardboard, wood, or other suitable material to which paper or other suitable material may be mounted. Parallel and adjacent to the entire periphery of said primary member 1 is furnished a plurality of apertures 4, adjacent and parallel to said apertures there being disposed a scale 5 for the purpose of identifying said apertures. Said apertures are used for mounting, by the use of pegs, the secondary members 2 and 3, which are described herein, to the primary member 1 in multiple and subsequent positions.

One form of the secondary member (FIG. 2), which is utilized in the drawing of all straight lines in the picture, drawing, design, or alphabetic letter, comprises a flat, elongated, rectangular shaped transparent body 2 with a scale 6 inscribed thereon, at one end of said member there being an aperture 7 which is used for mounting said secondary member 2 to a predetermined aperture 4 of the primary member 1 in a pivotal manner by the use of a peg 8. A second peg is then placed into another predetermined aperture in the primary member and the secondary member is then pivoted counterclockwise until it rests adjacent to and touching the second peg placed in the primary member. When said secondary member 2 is thus attached to the primary member, in accordance to a predetermined formula, a desired straight line of predetermined length may be drawn at a predetermined location on the surface of the paper or other material mounted on the primary member 1 through the use of a writing instrument by employing the edge of the secondary member 9 as a guide and observing a predetermined starting point and predetermined stopping point on the scale 6.

Another form of the secondary member 3, which is utilized in the drawing of all arcs or curves in the picture, drawing, design, or alphabetic letter, comprises a flat, spiral-shaped element 10 of transparent material and having a scale 11 inscribed on the entire periphery thereof. Said spiral-shaped element 10 is transversed by and mounted beneath a flat, elongated element 12 of transparent material with a scale 13 inscribed thereon for identification purposes, and having a plurality of apertures 14 for the accommodation of a peg 8 for the mounting of said secondary member 3 to the primary member 1 in a pivotal manner at one point, with said flat elongated element of the secondary member 12 being butted against another peg placed into another aperture of the primary member at a second point. When said secondary member 3 is thus attached, in accordance to a predetermined formula, arcs or curves of predetermined radii and lengths may be drawn at predetermined locations on the surface of the paper or other material mounted on the drawing surface of the primary member 15 through the use of a writing instrument by employing the edge 16 of the flat spiral-shaped element 10 of said secondary member 3 as a guide and observing a predetermined starting point and a predetermined stopping point on the scale 11 inscribed on said spiral-shaped element.

I claim:

1. A drawing device comprising a combination: a flat rectangular shaped primary member, adjacent and parallel to the periphery of which is disposed a plurality of identified apertures equally spaced about the entire periphery of said primary member for the accommodation of pegs; a flat elongated shaped secondary member of transparent material with a scale inscribed thereon, and having an aperture at one end thereof for the accommodation of a peg for the mounting of said secondary member to an aperture of the primary member in a pivotal manner at one point, with said secondary member being butted against another peg placed into another aperture of the primary member at a second point, whereby, the secondary member thus positioned, a straight line of predetermined length may be drawn at a predetermined location on the surface of the paper or other material mounted on the primary member, through the use of a writing instrument, by using the edge of said secondary member as a guide and observing a predetermined starting point and a predetermined stopping point on the scale inscribed thereon.

2. A drawing device comprising in combination: a flat rectangular shaped primary member, adjacent and parallel to the periphery of which is disposed a plurality of identified apertures equally spaced about the entire periphery of said primary member for the accommodation of pegs; a secondary member consisting of a flat spiral-shaped element of transparent material and having a scale inscribed on the entire periphery thereof, said spiral-shaped element being transversed by and mounted beneath a flat elongated element of transparent material having a plurality of identified apertures for the accommodation of a peg for the mounting of said secondary member to the primary member in a pivotal manner at one point with said flat elongated element of the secondary member being butted against another peg placed into another aperture of the primary member at a second point, whereby, the secondary member thus positioned, an arc or curve of predetermined radius and length may be drawn at a predetermined location on the surface of the paper or other material mounted on the primary member, through the use of a writing instrument, by using the edge of the spiral-shaped element of the secondary member as a guide and observing a predetermined starting point and a predetermined stopping point on the scale inscribed thereon.

* * * * *